Feb. 13, 1934. G. H. SNYDER ET AL Re. 19,081

CARDBOARD BOX.

Original Filed Dec. 12, 1930 3 Sheets-Sheet 1

Inventor
George H. Snyder,
Allen G. Snyder.
By Frank H. Borden
Attorney

Feb. 13, 1934. G. H. SNYDER ET AL Re. 19,081

CARDBOARD BOX

Original Filed Dec. 12, 1930 3 Sheets-Sheet 2

Inventor
George H. Snyder.
Allen G. Snyder.
By Frank H. Borden
Attorney

Feb. 13, 1934. G. H. SNYDER ET AL Re. 19,081

CARDBOARD BOX

Original Filed Dec. 12, 1930 3 Sheets-Sheet 3

INVENTORS,
George H. Snyder,
Allen A. Snyder,
BY
Frank H. Borden
ATTORNEY

Reissued Feb. 13, 1934

Re. 19,081

UNITED STATES PATENT OFFICE 19,081

CARDBOARD BOX

George H. Snyder, Glenside, and Allen G. Snyder, Chestnut Hill, Pa.

Original No. 1,839,779, dated January 5, 1932, Serial No. 501,770, December 12, 1930. Application for reissue July 1, 1933. Serial No. 678,698

19 Claims. (Cl. 229—30)

This invention, generally stated, relates to the art of box making and has more especial relation to boxes made of cardboard, particularly those used in the cigar box industry.

One object of the present invention is to provide a box made of cardboard comprising a tray and a shell, the end walls of the tray being so arranged that the inner faces thereof abut against the end edges of the side walls of the box, whereby the side walls of the tray are flush with the vertical, outer edges of the tray ends.

A further object of the present invention is to provide in a structure of the character stated a cardboard assembly of relatively uniform thickness in which a ridge is provided to accept the lid or cover so that the lid or cover comes to a firm, uniform seating, whereby mutilation of the box contents is prevented.

A further object of the present invention is to provide a box of cardboard the tray of which is longitudinally scored when died out so that the vertical, outer edges of the end walls are out of alignment with the said longitudinal scoring.

A still further object of the present invention is to provide a box of cardboard provided with a hinged lid or cover, the hinge being formed of fabric, adhesively secured along one edge between an outer wall of the tray and the inner wall of the shell, and adhesively secured to the inner face of the lid along its opposite edge.

Other and further objects of the present invention consist in the provision of general details of construction and arrangement and combination of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

Figure 1:
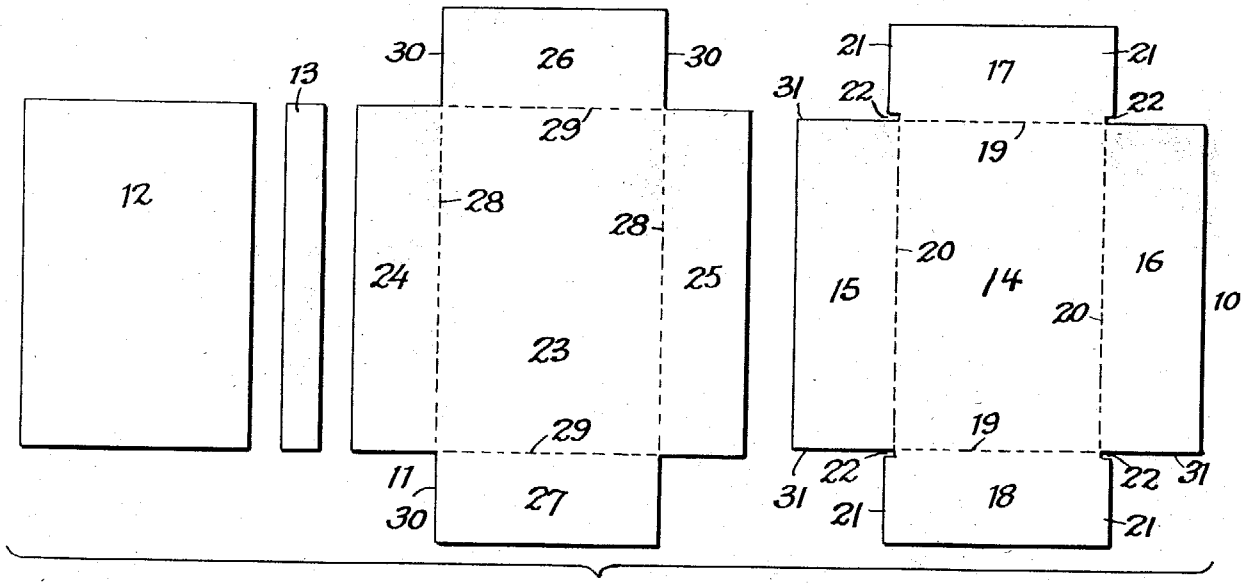
Fig. 1 is a plan view of the various parts going to make up the box embodying the invention.
Figure 4:
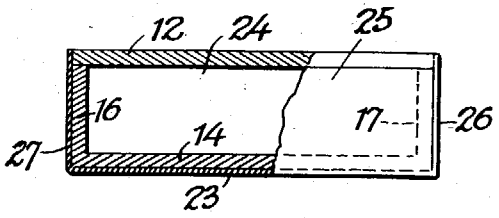
Fig. 4 is a view in side elevation of a box embodying the invention with parts broken away and showing the lid in closed position.

Referring to the drawings in detail, and with especial relation to Fig. 1, there is disclosed at the right-hand side of the drawings a blank 10 of cardboard, died out in accordance with the invention. This blank when properly died out, scored, and folded constitutes the tray of the box structure. To the left of the blank 10 just referred to is disclosed another blank 11 which when properly died out, scored and folded forms the shell for the tray as formed from blank 10. The reference numeral 12 designates a lid or cover and the reference numeral 13 designates a strip of fabric which may be muslin or any suitable material forming what is usually termed "hinge-cloth".

The blank 10 is provided with a bottom section 14, side flaps 15 and 16, and end flaps 17 and 18. In stamping out the blank 10 the same is scored laterally along the lines 19 and scored longitudinally along the lines 20. The longitudinal scoring 20 is out of alignment with the outer, vertical edges 21 of the end flaps 17 and 18. In alignment with the lateral scoring 19 the blank 10 is cut out at 22 so that the flaps 17 and 18 are free of the side flaps 15 and 16.

Taking up now the blank 11, the same comprises a bottom section 23, side flaps 24 and 25, and end flaps 26 and 27. The blank 11 is scored longitudinally as at 28 and scored laterally as at 29. In the connection it is to be noted that the longitudinal scoring 28 is in alignment with the outer, vertical edges 30 of the end flaps 26 and 27.

Figure 2:
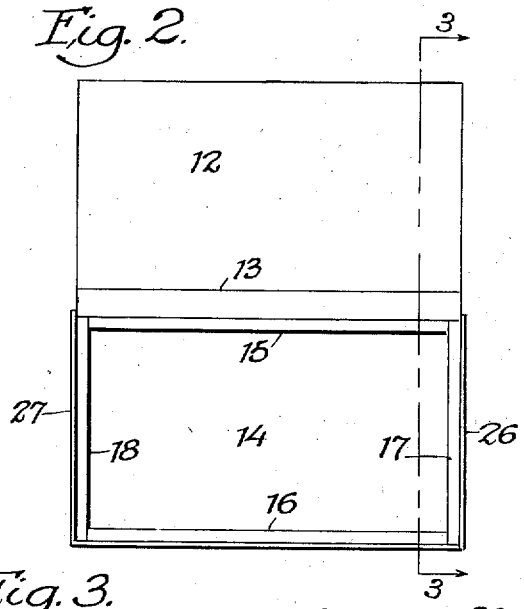
Fig. 2 is a top or plan view of a box embodying the invention, showing the lid or cover in open position.
Figure 5:
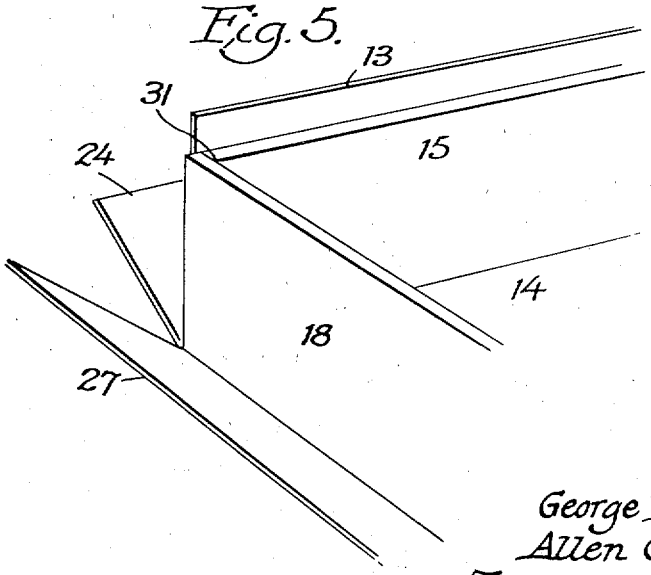
Fig. 5 is a fragmentary view in perspective illustrating one corner of a box structure embodying the invention showing the parts about to be assembled.

A description will now be given of the manner of assembling the parts shown in Fig. 1. The side flaps 15 and 16 of the blank 10 forming the tray are folded along the scoring 20 and the end flaps 17 and 18 are folded along the scoring 19 so that the inner faces of the end flaps 17 and 18 abut flatwise against the vertical edges 31 of the side flaps 15 and 16, as clearly shown in Fig. 5. In this position of parts it is to be noted that the outer faces of the side flaps 15 and 16 are flush with the vertical edges 21 of the end flaps 17 and 18, so that a continuous smooth surface having a sharp square corner is provided in contradistinction to a surface having a rough or double corner, as would be present if the opposed vertical edges 21 and 31 of the flaps 17 and 18 merely met as would be the case if the scorings 20 were in alignment with the vertical edges 21 of the end flaps 17 and 18, and which in any case is usually present at the bottom edges marking the junction of bottom 14 with bent up walls 15, 16, 17 and 18. The tray thus formed from the blank 10 has fitted therearound the shell as formed from blank 11, by which all tray corner edges are concealed and reinforced by the shell, and the various flaps of the tray and shell adhesively secured together. At the time the flaps are adhesively secured together the lower edge of the hinge-cloth 13 is positioned between the outer wall of the tray flap 15 and the inner wall of the shell flap 24, and the opposite edge of the hinge-cloth is adhesively secured to the inner face of the lid or cover 12, as best seen in Figs. 2 and 3.

Figure 3:
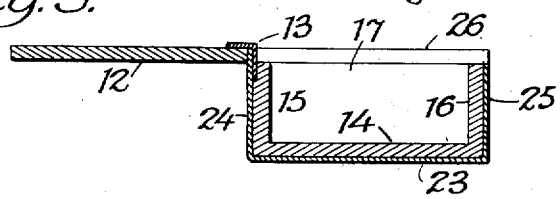
Fig. 3 is a view in cross-section taken upon the line 3—3 of Fig. 2.

In assembling the box, the tops of the end flaps 26 and 27 of the shell as formed from blank 11 extend in a plane above the top edges of the side flaps 24 and 25 and also extend in a plane above the top edges of the flaps 15, 16, 17 and 18 of the tray formed from blank 10, as best seen in Fig. 3. This arrangement of parts provides flap top edges upon which the box lid may rest, and at the same time provides a rim or flange at the box ends. This flange or rim prevents endwise movement of the lid or cover in closed position and at the same time affords a neat appearance in that the end, lateral edges of the box lid are not discernible.

Figure 6:
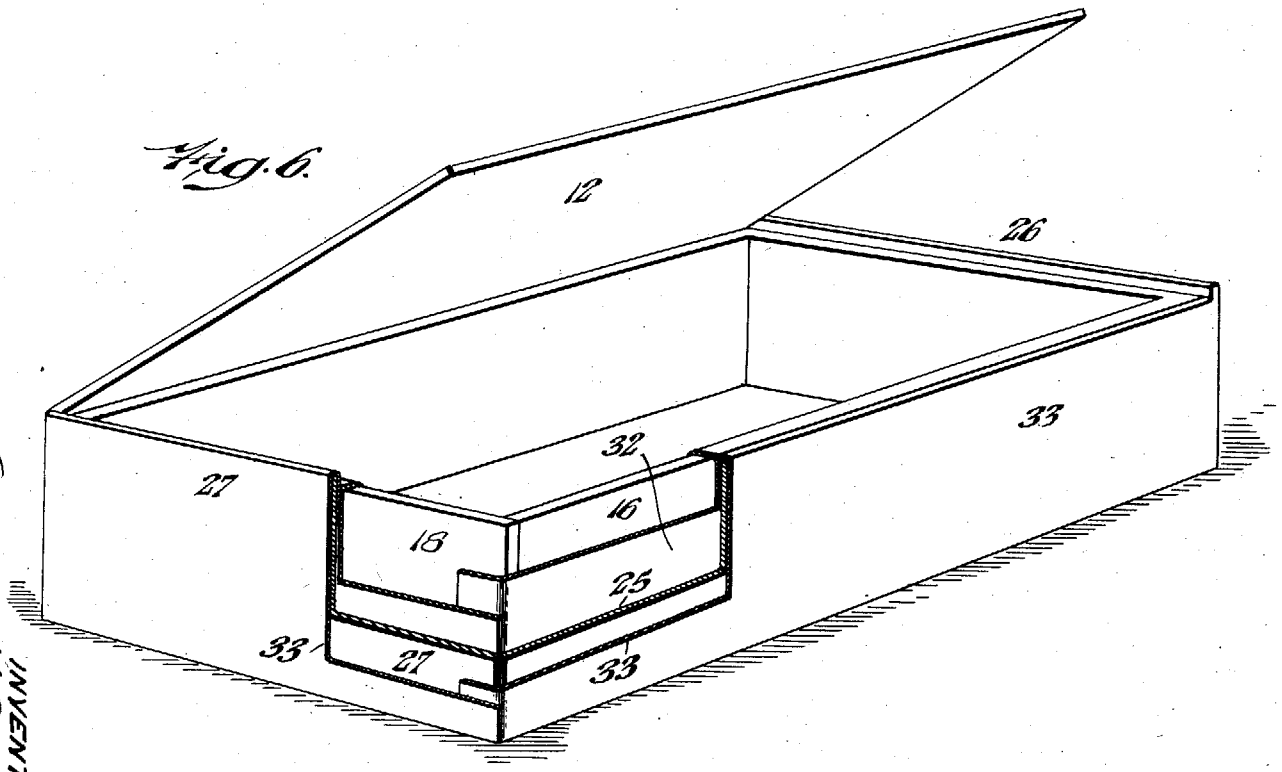
Fig. 6 represents a perspective of an illustrative form of composite box according to this invention with one corner partly broken away and showing the relation of parts and an illustrative form of wrapper on both the shell and the tray.

A box of cardboard constructed as above described is very strong and durable and the blanks may be died out without the employment of special tools. The blanks 10 and 11 when died out may be covered with paper by means of standard wrapping machinery. Further, the box structure may be inexpensively put together. Also, by having the hinge-cloth arranged between the walls of the tray and the shell and secured to the inner face of the box lid, a much strengthened arrangement of hinge-joint is provided and the hinged parts are concealed without the necessity of weakening of the rear wall of the box. In the drawings Fig. 6 shows the relation of each cardboard element and its paper covering embodying the invention. It may be stated that after the tray blank has been died out, scored and folded it is covered with paper as by a paper wrapper shown for example at 32 and constituting an illustrative form of reinforcement for the corners by means of conventional wrapping machinery of the Stokes and Smith type. After the shell blank has been died out, scored and folded it is covered with paper as by a paper wrapper shown for example at 33 and constituting an illustrative form of reinforcement for the corners, by means of standard wrapping machinery of the Stokes and Smith type. The lid or cover is also covered with paper by conventional machinery.

It is to be noted as an aid in the simulation of the size, strength and appearance of a conventional cigar box that the stock from which the tray is made is appreciably thicker than the stock from which the shell is made, which, while each contributes to the necessary rigidity and strength of the walls and bottom, also provides that the relatively rough or double bottom edges derived from folding the relatively thicker tray are concealed by the shell, and that the folded thinner shell forms relatively sharp outer corner edges of the side and bottom of the composite box. Also, it is our intention to include as part of our invention the manner or method of fabricating a box of said board so that the end flaps of the tray abut flatwise against the vertical ends of the side flaps of the box. Further, it is our intent to include the manner or method of box formation in which the hinge-cloth is introduced adhesively between the outer wall of the tray and adhesively applied directly to the cardboard stock of the inner face of the lid or cover in contradistinction to the rear wall of the box.

What we claim as new, and desire to secure by Letters Patent, is:

1. A cardboard box formed by nesting an inner blank and an outer blank, the inner blank having four flaps constituting sides and ends and being longitudinally scored out of alignment with the outer lateral edges of its end flaps whereby when said four flaps are folded into box form the end edges of two flaps abut the inner side faces of the other two flaps, the outer blank having four flaps folded up and adhesively secured to the four flaps of the first-mentioned blank, and means securing the outer flaps together at their corners, the both blanks having such thickness as to substantially aid in providing necessary rigidity in the side and end walls of the finished box.

2. A cardboard box of the character stated in claim 1 characterized by the top edges of the end walls of the outer blank lying in a plane above the top edges of the inner blank, thus to provide a ledge to accommodate a lid, and a lid having hinged relation with said box for seating upon said ledge.

3. A cardboard box of the character stated in claim 1, characterized by a hinge cloth connecting said box, the lower marginal edge of said hinge cloth being adhesively secured between adjacent walls of said inner and outer blanks.

4. A cardboard box formed by nesting an inner blank and an outer blank, the inner blank having four flaps constituting sides and ends and folded into box form, the outer blank having four flaps folded up and adhesively secured to and substantially covering the outer surfaces of the four flaps of the first-mentioned blank, and means securing the outer flaps together at their corners, the both blanks having such thickness as to substantially aid in providing necessary rigidity in the side and end walls of the finished box.

5. A cardboard box formed by nesting an inner and an outer blank, the inner blank having four flaps constituting sides and ends and folded into box form, the outer blank having four flaps folded up and adhesively secured to the four flaps of the first-mentioned blank, means securing the outer flaps together at their corners, the both blanks having such thickness as to substantially aid in providing necessary rigidity in the side and end walls of the finished box, and the top edges of the outer blank ends lying in a plane above the top edges of the inner blank ends, thus to provide a ledge to accommodate a lid, and a lid having hinged relation with said box for seating upon said ledge.

6. A cardboard box comprising an inner blank having four flaps forming sides and ends, means securing the flaps together at their corners, an outer blank having four flaps forming sides and ends, means securing the flaps of the outer blank together at their corners, the inner and outer blanks being disposed in adhesive nested relation with the walls of the inner blank substantially covered by the walls of the outer blank and so disposed and of such thickness as to aid in providing necessary rigidity in the side and end walls of the finished box.

7. A cardboard box comprised of a bottom and side and end walls of rigidity and appreciable thickness, each wall comprised of a plurality of laminations of cardboard in adhesively secured relation, the bottom comprised of a plurality of laminations of cardboard, the junction of walls with contiguous walls being marked by the provision of means reinforcing the corners, the whole so bonded together as to form a box comparing favorably in thickness, strength and rigidity with a box of wood.

8. A cardboard simulation of a wooden cigar box comprising a tray having side and end walls the end walls of which abut the vertical edges of the side walls, and a shell having side and end walls, the tray nested and adhesively secured within the shell, the upper edges of the sides of the shell and tray being in the same plane, the upper edges of the end walls of the shell being above the level of the said plane of the side walls.

9. A cardboard box comprised of a tray of cardboard including side walls and a bottom formed from a blank, end walls the inner surfaces of which abut the edge surfaces of the side walls, reinforcing means for the corners to maintain the abutting assembly, a shell formed of a blank having side and end walls, reinforcing means for the corners of the walls of the shell, the tray being nested in the shell and adhesively secured to the shell so that the respective walls of one element reinforce and stiffen the walls of the other element to form a whole of usable rigidity and strength and the respective shell walls being of such area as substantially to cover the respective walls of the tray.

10. A cardboard box comprised of a tray having a bottom, sides and ends, a shell comprised of a bottom, sides and ends, the tray being nested within the shell with contiguous walls adhesively secured together, the side walls of the shell and tray terminating at substantially the same level to form a seat for a lid, the end walls of the shell being higher than the said side walls of the shell and of such area as substantially to cover and conceal the end wall surfaces of the tray, the walls of the tray and shell both having such thickness as to substantially aid in providing necessary rigidity in the side and end walls of the finished box.

11. A cardboard box comprised of a tray having a bottom, sides and ends, a shell comprised of a bottom, sides and ends, the tray being nested within the shell with contiguous walls adhesively secured together, the walls of the tray and shell both having such thickness as to substantially aid in providing necessary rigidity in the side and end walls of the finished box, the end walls of the shell having their upper edges in a plane higher than the side walls thereof and higher than the adjacent end walls of the tray, the respective side walls of the shell and tray being of substantially the same level to form a ledge to accommodate a lid vertically slidable between the extensions of the ends of the shell.

12. A box comprising an inner member having walls, and an outer member having walls, the inner member nested in the outer member, certain walls of the inner and outer members being of the same level, and certain walls of the outer member being higher than said certain walls of the inner member by a distance approximately the same as the thickness of the lid for the box.

13. A box comprising an inner member having walls, and an outer member having walls, the inner member nested in the outer member, certain walls of the inner and outer members being of the same level, and certain walls of the outer member being higher than corresponding walls of the inner member, a lid disposed upon the upper edges of all of the walls of the inner member and movably disposed between the higher parts of said certain walls of the outer member.

14. A cardboard simulation of a wooden cigar box comprising a tray having side and end walls in abutting relation to form closed corners, reinforcing coverings for said corners, a shell having side and end walls and adhesively secured to and substantially covering the respective walls of the tray, means securing the corners of the shell, the tray and shell having such thickness as to substantially aid in providing necessary rigidity in the side and end walls of the finished box.

15. A cardboard simulation of a wooden cigar box comprising a tray having side and end walls in abutting relation to form closed corners, and a shell having side and end walls, the tray nested and adhesively secured within the shell, the upper edges of the sides of the shell and tray being in the same plane, the upper edges of the end walls of the shell being above the level of the said plane of the side walls.

16. A cardboard cigar box comprised of a bottom and side and end walls of substantial thickness, rigidity and strength, each wall being comprised of a plurality of laminations of cardboard in adhesively secured relation, the outer lamination of the walls and of the bottom being formed from a relatively thin cardboard blank, the wall-forming flaps of said blank being of such area as to approximately cover the respective juxtaposed surfaces of adjacent laminations, the plurality of laminations of the side walls of the box having their respective upper edges in substantial registration to form a seat for a lid, and the outer lamination of the end walls terminating at a level above the upper edge of the side walls by approximately the thickness of a lid.

17. A cardboard box comprised of a tray having a bottom, and side and end walls formed of relatively thick and heavy cardboard, a shell comprised of a bottom and side and end walls formed of relatively light and thin cardboard, the tray being nested within the shell with contiguous walls adhesively secured together, the walls being jointly of such thickness and so arranged as to aid in the simulation of a conventional cigar box by providing that the outer corner edges of the composite box are formed from the relatively thin shell while the corner edges of the thicker tray are concealed by the shell.

18. A cardboard box comprised of a tray having a bottom and having side and end walls in relative abutting relation to form closed corners, reinforcing means holding the tray corners closed, a shell comprising a bottom and walls, the tray nested within the shell with contiguous walls secured together, the walls of the shell and tray having such thickness as to substantially aid in providing necessary rigidity and strength in the end walls of the finished box.

19. A box comprising an inner member having walls, and an outer member having walls, the inner member nested in the outer member, a pair of walls of the outer member being higher than a wall of the inner member by the thickness of a lid, a lid removably disposed on the lower wall of the inner member, and movable between the higher parts of said pair of walls of the outer member.

GEORGE H. SNYDER.
ALLEN G. SNYDER.